United States Patent [19]

Hauck et al.

[11] 4,192,889

[45] Mar. 11, 1980

[54] RUMINANT FEEDS CONTAINING TRICHLOROETHYL ESTERS OF ESSENTIAL AMINO ACIDS

[75] Inventors: Frederic P. Hauck, Bridgewater, N.J.; Venkatachala L. Narayanan, Bethesda, Md.; Jeremiah J. O'Connor, Flemington; Raymond R. Pilote, Somerset, both of N.J.

[73] Assignee: E. R. Squibb & Sons, Inc., Princeton, N.J.

[21] Appl. No.: 1,988

[22] Filed: Jan. 8, 1979

Related U.S. Application Data

[62] Division of Ser. No. 907,516, May 19, 1978.

[51] Int. Cl.$^2$ ............................................. A61K 31/24
[52] U.S. Cl. ..................................... 424/309; 424/319
[58] Field of Search .......................................... 424/309

[56] References Cited

U.S. PATENT DOCUMENTS

| | | | |
|---|---|---|---|
| 3,080,234 | 3/1963 | Jarowski | 424/11 |
| 3,794,732 | 2/1974 | Raun | 424/283 |

OTHER PUBLICATIONS

Marinier et al., Can. J. Chem., vol. 51 (1973), pp. 208–214.

*Primary Examiner*—V. D. Turner
*Attorney, Agent, or Firm*—Lawrence S. Levinson; Burton Rodney

[57] ABSTRACT

The rate of growth and feed efficiency of ruminants is increased by adding to the feed of ruminants an effective amount of the trichloroethyl ester of an essential amino acid.

8 Claims, No Drawings

RUMINANT FEEDS CONTAINING TRICHLOROETHYL ESTERS OF ESSENTIAL AMINO ACIDS

This is a division, of copending application Ser. No. 907,516, filed May 19, 1978.

BACKGROUND OF THE INVENTION

The demand for ruminants such as cattle, sheep, etc. has increased considerably in recent years. The supply of feed for ruminants, however, has failed to keep pace with increased demand, and the cost of such feed has increased. It is important that improved means be found for the efficient use by ruminants, having a developed rumen function, of the nutrients present in normal feeds. New and more efficient growth promoters are continually being sought to give ruminants increased weight gain (referred to as growth promotion) and increased weight gain per pound of normal feed (referred to as increased feed efficiency or increased efficiency of feed utilization).

Various antibiotics have been suggested as growth promoters for various animals. See, for example, U.S. Pat. Nos. 3,790,668, 3,794,732 and 3,937,836. U.S. Pat. No. 3,914,428 suggests the use of 2-arylimino-1,3-dithietane compounds for this purpose.

It has also been proposed to improve efficiency of amino acid utilization by the use of certain amino acids as in U.S. Pat. No. 3,080,234, but there are limiting factors related to the proportions of certain amino acids in the plasma.

Certain lysine derivatives in which the carboxyl group is esterified and the 6-amino group bears certain substituents are disclosed as anti-allergic compounds in U.S. Pat. No. 3,539,602.

The use of the 2,2,2-trichloroethyl group for carboxyl protection during peptide synthesis is described in Can. J. Chem. 1973, 51(2), 208–14.

It has been found that the trichloroethyl esters of essential amino acids provide superior growth promoting properties and increase feed utilization efficiency when supplied in the feed of ruminants.

The chemical composition of the rumen fluid provides a means for ascertaining feed efficiency and the weight gain of the ruminant. Rumen fluid contains a substantial proportion of volatile carboxylic acids, including acetic, propionic and butyric acids. These acids, which provide the principal source of energy for the ruminant, are derived from carbohydrate fermentation by rumen microflora. Propionic acid is particularly indicative of feed efficiency and weight gain; i.e., increases in the level of propionic acid in rumen fluid are immediately reflected by improved feed utilization by the ruminant. Chemical changes in the rumen fluid can be measured by chemical analysis of samples of rumen fluid withdrawn from a ruminant.

Based on the knowledge of the foregoing, a practical method of testing growth promoters in vitro has been the simulation of conditions in the rumen with fermentation reactions. Such a method comprises adding the test substance to a substrate such as ground hay, corn or mixtures of feed materials. Rumen fluid from a fasted ruminant (bovine, ovine, or caprine) is mixed with a buffer solution and added to a fermentation flask containing the test additive and the substrate. The flask is purged of oxygen, stoppered with a pressure release valve, and incubated at 39°±1° C. for periods up to 48 hours. The change in volatile fatty acid concentration is determined by chemical analysis of the rumen fluid before and after fermentation. As a control, the above experiment is run without a test additive.

The correlation of rumen fluid analysis and growth stimulation is well established and can be corroborated by in vivo experiments which measure ruminant weight gain and feed efficiency over a period of time.

SUMMARY OF THE INVENTION

This invention relates to a feed composition of improved efficiency comprising a growth promoting amount of the trichloroethyl ester of an essential amino acid or acid addition salt thereof, and to a method for promoting growth and increasing feed efficiency in ruminants with such a feed composition.

The essential amino acids are defined as glycine, leucine, isoleucine, valine, threonine, lysine, phenylalanine, methionine, arginine, histidine and tryptophan. The trichloroethyl esters of these essential amino acids can then be defined as those having the formula

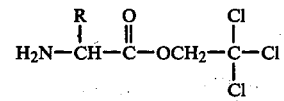

wherein R is hydrogen, isobutyl, 1-methylpropyl, isopropyl, 1-hydroxyethyl, 4-aminobutyl, phenylmethyl, 2-(methylthio)ethyl, guanidinopropyl, imidazolylmethyl or indolylmethyl.

DETAILED DESCRIPTION OF THE INVENTION

It has been found that the trichloroethyl ester of an essential amino acid is a particularly effective growth promoter and provides improved feed efficiency for ruminants, having a developed rumen function, especially cattle and sheep. Thus when an effective amount of the trichloroethyl ester of an essential amino acid having formula I above, or an acid addition salt thereof, is added to an otherwise nutritionally adequate and balanced feed supplied to the ruminant, an enhanced feed efficiency and rate of growth is attained.

The essential amino acids for animals include those named above and consequently feed compositions containing a growth promoting amount of the trichloroethyl ester of one of the amino acids phenylalanine, glycine, lysine, methionine, arginine, histidine, leucine, isoleucine, threonine, tryptophan or valine or a physiologically acceptable acid addition salt thereof, and a method of promoting growth and improving feed efficiency in ruminants is the object of this invention. Preferred for the purposes of this invention are the trichloroethyl esters of the amino acids glycine, phenylalanine, lysine and methionine, i.e., those esters of formula I wherein R is hydrogen, phenylmethyl, 4-aminobutyl or 2-(methylthio)ethyl.

The compounds of formula I form acid addition salts with the common organic and inorganic acids, including salts such as the hydrohalides like hydrochloride, hydrobromide, etc., sulfate, nitrate, acetate, propionate, etc. The physiologically acceptable, digestible salts are therefore also within the scope of the invention.

The essential amino acid trichloroethyl ester is supplied to the ruminant to enhance growth and feed efficiency, according to this invention, in an amount of about 0.01 to about 5 grams per day, preferably in the range of about 0.06 to 1.6 grams per day. For example, in the case of a fattening lamb consuming about 3 pounds of feed per day, the feed additive is preferably administered in an amount of about 15 to 240 mg. per day, preferably 60 to 240 mg. per day. Based on cattle consuming about 20 pounds of feed per day, the feed additive is supplied in an amount of about 100 to 1600 mg. per day, preferably about 400 to 1600 mg. per day.

The feed additive of formula I or its physiologically acceptable salt is admixed with a conventional, basic animal feed such as those described below and fed to the ruminant as part of its regular diet in the usual manner. Expressed in terms of feed material, the feed additive of this invention is supplied in an amount of about 0.001% to about 0.06% by weight of total feed or about 10 gm. to 500 gm. per ton of feed. Preferably the feed additive comprises about 0.004% to about 0.016% or about 40 to 160 gm. per ton of feed, especially about 0.005% to about 0.009% or about 50 to 80 gm. per ton of feed. A premix can also be prepared according to conventional practice. Thus the recommended amount of the feed additive of this invention can be incorporated in a pound of premix which is then thoroughly admixed with a ton of conventional feed. The premix composition can thus comprise about 10 to 500 gm., preferably 40 to 160 gm., of a compound of formula I or salt thereof and one pound of feed material of the same kind with which it will be admixed for feeding to the ruminant. Other conventional optional ingredients can also be included in the premix.

Any basic feed material conventionally used for nourishing ruminant animals can be used as a vehicle for the trichloro esters of essential amino acids according to this invention. They include the common dry feeds, liquid feeds or pelleted feeds, preferably the first. Such compositions are of the following nature.

Cellulosic roughage (i.e., a nutrient component containing at least 5% fiber) is an essential component in ruminant feeds. The fiber content of the cellulosic roughage is principally cellulose which may contain lignin chemically bound thereto. Hay, straw, cottonseed hulls, cotton mill wastes, beet pulp, silage, ground corn cobs, corn stalks, oats, barley, cereal brans and cereal middlings are typical fiber containing feeds. At least one cellulosic roughage component is essential in a balanced ruminant feed, and at least 0.5% by weight of such a component is included therein; as much as 60% by weight or more of cellulosic roughage can be used in ruminant feed.

Protein or nitrogen sources such as soybean meal, cottonseed meal, dehydrated alfalfa, linseed meal, coconut meal, cereal grains, urea, biuret, etc. are often included in a ruminant feed. Additionally, mineral ingredients such as bone meal, limestone, sodium chloride, and trace minerals such as salts of zinc, copper, manganese, cobalt, iodine and iron are often included in a ruminant feed in an amount of up to about 2% by weight. Other materials which are sometimes incorporated into a ruminant feed include animal ingredients such as fish meal, meat and bone scraps, dried milk, animal fats, and dried whey solubles; vitamins; vegetable oils such as soybean oil, safflower oil, corn oil, peanut oil, cottonseed oil, and others; and non-toxic antioxidants such as butylated hydroxy toluene, propyl gallate, etc.

The compounds of formula I are produced by esterifying the amino acid with trichloroethanol according to conventional methods, preferably in which the amino group is protected during the reaction. A preferred method of synthesis comprises reacting the amino acid in which the amino group is protected, e.g., with a carbobenzyloxy group, with about an equimolar proportion of trichloroethanol in an inert organic solvent such as acetonitrile in the presence of an organic base like pyridine and dicyclohexylcarbodiimide as catalyst at about ambient temperature. The protecting group is then removed by conventional techniques, e.g., using hydrogen bromide in acetic acid. Additional details are provided in the illustrative examples which follow.

The following examples are illustrative of the various aspects of the invention and represent preferred modifications. They also serve as models for the preparation and use of other modifications within the scope of the invention described.

EXAMPLE 1

Preparation of trichloroethyl ester of glycine (a) Carbobenzyloxyglycine 2,2,2-trichloroethyl ester To a cooled solution of 31.4 g. (0/15 mole) of carbobenzyloxyglycine in 500 ml. of acetonitrile, 22.4 g. (0.15 mole) of trichloroethanol and 11.9 g. (0.15 mole) of pyridine are added. A solution of 30.9 g. (0.15 mole) of dicyclohexylcarbodiimide in 100 ml. of acetonitrile is added to the reaction mixture and it is stirred at room temperature for 18 hours. The precipitate is filtered and the solution concentrated in vacuo to give 49.5 g. (96.8%) of carbobenzyloxyglycine 2,2,2-trichloroethyl ester as an oil.

(b) Aminoacetic acid 2,2,2-trichloroethyl ester, hydrobromide

A well stirred solution of 45.0 g. (0.13 mole) of carbobenzyloxyglycine 2,2,2-trichloroethyl ester in 100 ml. of glacial acetic acid is cooled to 20° and 100 ml. of 5 N HBr—$CH_3CO_2H$ is added. After 10 minutes, a vigorous evolution of gas occurs. The reaction mixture is stirred at room temperature for two hours. The mixture is then diluted with dry ethyl ether and the precipitate is filtered. The product is crystallized from acetonitrile to give aminoacetic acid 2,2,2-trichloroethyl ester, hydrobromide as white crystals; m.p. 238°–240° (d); 29.5 g. (78.9%).

EXAMPLE 2

Preparation of phenylalanine trichloroethyl ester (a) Benzyloxycarbonyl-L-phenylalanine 2,2,2-trichloroethyl ester To a solution of 5.98 (20 mmole) of benzyloxycarbonyl-L-phenylalanine, 2.12 ml. (20 mmole) of trichloroethanol and 1.62 ml. (20 mmole) of pyridine in 40 ml. of acetonitrile is added 4.12 g. (20 mmole) of dicyclohexylcarbodiimide. After three hours, the precipitated dicyclohexylurea is filtered and the solvent is evaporated to an oil which is chromatographed on a silica gel column and eluted with chloroform to yield benzyloxycarbonyl-L-phenylalanine 2,2,2-trichloroethyl ester as a colorless oil (7.95 g., 92% yield).

(b) L-Phenylalanine 2,2,2-trichloroethyl ester, hydrobromide

To a solution of 4.12 g. of the product of part a in 5 ml. of acetic acid is added 5 ml. of 6.0 N HBr in acetic acid. After an hour, 500 ml. of ether is added and the resulting solid L-phenylalanine 2,2,2-trichloroethyl ester, hydrobromide is filtered, dried and recrystallized from alcohol/ether; weight 2.6 g. (72% yield), m.p. 195°-197°, $[\alpha]_D - 11.90°$ ($H_2O$, C=5%).

EXAMPLE 3

A one gram sample of substrate ground through a 1 mm screen is weighted into 100 ml. lipless beakers equipped with gas-release valves. The substrate consists of alfalfa hay containing approximately 16% protein and a concentrate containing ground corn 60.7%, alfalfa meal 17.5%, molasses 10.0%, soybean meal 5.3%, wheat bran 5.0%, trace mineralized salt 1.0%, limestone 0.5% and Vitamin D 300,000 I.U./ton, mixed in the proportion 3:1. The experimental composition is added to the substrate. 25 ml. of filtered rumen fluid obtained from fasted sheep maintained on feed the same as the above mentioned substrate and 25 ml. of McDougal's buffer solution serve as the inoculum. The buffer solution is as follows:

|  | g/liter |
|---|---|
| $NaHCO_3$ | 9.80 |
| KCl | 0.57 |
| $Na_2HPO_4$ | 3.69 |
| NaCl | 0.47 |
| $MgSO_4 \cdot 7H_2O$ | 0.12 |
| $CaCl_2$ | 0.04 |

The fermentation mixture is flushed with carbon dioxide and the vessel is capped with a gas release valve. The fermentation vessel (beaker) is placed in a water bath and incubated at 39° C.±1° for six hours. The sample is mixed every hour by shaking the beaker.

At the end of the 6-hour fermentation period the sample is strained through 4 layers of cheesecloth into a sample bottle containing 1 ml. saturated solution of mercuric chloride. The sample is frozen immediately until analyzed for the volatile fatty acids (VFA) (mg/100 ml.). Prior to analysis, each sample is acidified with 30% phosphoric acid and then analyzed by gas chromatography using a column containing 5% nonylphenoxypolyoxyethylene ethanol plus 0.5% phosphoric acid on 100-120 mesh Gas Chrom S. The acids determined are acetic, propionic, butyric, isobutyric, valeric and isovaleric acids. Total VFA is considered as the addition of these acids. The ratio of acetic:propionic (A:P) is obtained by dividing the concentration of acetic acid by that of propionic acid. The results are given in Table 1. The data demonstrate that the trichloroethyl ester of phenylalanine at all levels is effective in increasing the propionic acid concentrations and decreasing the acetic to propionic acid ratio.

TABLE 1

Effects of L-phenylalanine, 2,2,2-trichloroethyl ester on volatile fatty acid concentrations in the in vitro rumen fermentation

| Level mg/ml | Acetic Acid | Propionic acid | Butyric Acid | Total acids | Acetic: propionic |
|---|---|---|---|---|---|
|  | ----- % of control ----- |  |  |  |  |
| 0.02 | 95 | 115 | 106 | 101 | 83 |
| 0.04 | 85 | 111 | 114 | 95 | 77 |
| 0.08 | 95 | 112 | 108 | 100 | 84 |
| 0.1 | 92 | 124 | 116 | 102 | 74 |
| 0.2 | 90 | 120 | 114 | 100 | 75 |
| 0.4 | 83 | 114 | 115 | 94 | 73 |

EXAMPLE 4

To demonstrate the activity of L-phenylalanine, 2,2,2-trichloroethyl ester is not limited to a particular type of ratio, the compound was tested with a high concentrate substrate. The procedure is described in Example 3. In this example, however, the substrate consisted of alfalfa hay and concentrate in the ratio of 1:3 and inoculum was obtained from sheep fed alfalfa and concentrate in the ratio of 1:3. The concentrate (Fit-N-Fresh) is commercially available from Agway, Inc. and contains grain products, plant protein products, processed grain by-products, cane molasses, minerals, vitamins and a preservative. The data in Table 2 show that the compound is effective in increasing the propionic acid concentration and decreasing the acetic:propionic ratio.

TABLE 2

Effects of L-phenylalanine trichloroethyl ester on volatile fatty acid concentrations in the in vitro rumen fermentation

| Level mg/ml | Acetic acid | Propionic acid | Butyric acid | Total acids | Acetic: propionic |
|---|---|---|---|---|---|
|  | % of control |  |  |  |  |
| .02 | 80 | 116 | 114 | 95 | 69 |
| .1 | 76 | 115 | 113 | 92 | 66 |
| .2 | 76 | 116 | 113 | 92 | 65 |
| .4 | 79 | 120 | 116 | 96 | 65 |
| 1.0 | 76 | 119 | 112 | 92 | 64 |

EXAMPLE 5

Mature sheep (wethers) fitted with permanent rumen fistulae were used to determine the effect of L-phenylalanine, 2,2,2-trichloroethyl ester on volatile fatty acid concentrations in vivo (3 wethers per treatment). The animals were individually penned and fed 227 g. of concentrate (described in Example 3) and 680 g. of alfalfa hay once daily. The test compound was admixed with the concentrate. The sheep were medicated for 7 days. Samples for analysis were obtained before (Day 0) and after treatment (Day 7) approximately 6 hours after feeding. The data presented in Table 3 demonstrate that the compound increased the proportion of propionic acid and decreased the acetic:propionic ratio.

TABLE 3

Effects of phenylalanine trichloroethyl ester on volatile fatty acid concentrations in fistulated sheep

|  | Level mg/head/day | Daily observations | |
|---|---|---|---|
|  |  | Pretreatment | treatment |
|  |  | 0 | 7 |
| Acetic acid (%) | 0 | 62.7 | 61.6 |
|  | 200 | 63.7 | 59.7 |
|  | 500 | 63.1 | 52.5 |
| Propionic acid (%) | 0 | 17.5 | 17.4 |
|  | 200 | 18.2 | 19.3 |
|  | 500 | 18.6 | 21.5 |

-continued

| | Level | Daily observations | |
|---|---|---|---|
| | mg/head/day | Pretreatment | treatment |
| Butyric acid (%) | 0 | 14.3 | 15.5 |
| | 200 | 12.8 | 15.1 |
| | 500 | 12.7 | 18.0 |
| Other acids (%) | 0 | 5.6 | 5.5 |
| | 200 | 5.4 | 5.8 |
| | 500 | 5.7 | 8.1 |
| Total acids (mg/100 ml.) | 0 | 700 | 698 |
| | 200 | 657 | 667 |
| | 500 | 614 | 624 |
| Acetic:propionic ratio | 0 | 3.60 | 3.56 |
| | 200 | 3.52 | 3.11 |
| | 500 | 3.39 | 2.43 |

EXAMPLE 6

An experiment similar to that described in Example 5 was performed except that the animals (3 per treatment) were fed 454 g. of concentrate (described in Example 3) and 454 g. of chopped mixed (grasses) hay. The results presented in Table 4 show that L-phenylalanine, 2,2,2-trichloroethyl ester was effective in increasing the proportion of propionic acid and decreasing the acetic:propionic ratio with this type of diet.

TABLE 4

Effects of phenylalanine trichloroethyl ester on volatile fatty acid concentrations in the rumen of fistulated wethers

| | | Daily observations | |
|---|---|---|---|
| | Level mg/head/day | Pre-treatment 0 | Treatment 7 |
| Acetic acid (%) | 0 | 58.7 | 57.3 |
| | 200 | 58.8 | 50.3 |
| | 500 | 57.5 | 45.7 |
| Propionic acid (%) | 0 | 16.0 | 16.2 |
| | 200 | 17.5 | 19.0 |
| | 500 | 16.8 | 21.1 |
| Butyric acid (%) | 0 | 19.3 | 20.0 |
| | 200 | 18.4 | 22.5 |
| | 500 | 19.0 | 23.5 |
| Other acids (%) | 0 | 6.1 | 6.6 |
| | 200 | 5.2 | 8.2 |
| | 500 | 6.7 | 9.8 |
| Total acids (mg/100 ml) | 0 | 773 | 687 |
| | 200 | 731 | 663 |
| | 500 | 851 | 734 |
| Acetic:propionic ratio | 0 | 3.68 | 3.54 |
| | 200 | 3.38 | 2.65 |
| | 500 | 3.43 | 2.18 |

EXAMPLE 7

The 2,2,2-trichloroethyl ester of glycine was tested in vitro in a manner similar to that described in Example 4. The results shown in Table 5 demonstrate that this compound is effective in increasing propionic acid concentration and decreasing the acetic:propionic ratio.

TABLE 5

Effects of glycine trichloroethyl ester on volatile fatty acid concentrations in the in vitro rumen fermentation

| Level mg/ml | Acetic acid | Propionic acid | Butyric acid | Total acids | Acetic: propionic |
|---|---|---|---|---|---|
| | | | % of control | | |
| 0.2 | 79 | 123 | 119 | 98 | 64 |
| 0.4 | 79 | 123 | 119 | 98 | 64 |

EXAMPLE 8

To demonstrate that the 2,2,2-trichloroethyl ester of glycine was also effective in vivo, an experiment similar to Example 5 was performed. The results shown in Table 6 demonstrate that this compound is effective in increasing the proportion of propionic acid and decreasing the acetic:propionic ratio.

TABLE 6

| | Level | Daily observations | |
|---|---|---|---|
| | mg/head/day | Pre-treatment | Treatment |
| Acetic acid (%) | 0 | 59.9 | 62.7 |
| | 500 | 60.8 | 56.0 |
| Propionic acid (%) | 0 | 18.9 | 18.6 |
| | 500 | 18.1 | 19.6 |
| Butyric acid (%) | 0 | 14.8 | 14.6 |
| | 500 | 15.1 | 17.9 |
| Other acids (%) | 0 | 6.5 | 4.2 |
| | 500 | 6.1 | 6.6 |
| Total acid (mg/100 ml) | 0 | 689 | 678 |
| | 500 | 715 | 731 |
| Acetic:propionic ratio | 0 | 3.16 | 3.38 |
| | 500 | 3.36 | 2.86 |

EXAMPLE 9

A test was conducted to determine if feeding L-phenylalanine 2,2,2-trichloroethyl ester to growing lambs was effective in improving growth and feed efficiency. Wether and ewe lambs were divided into groups of 30 lambs each. They were acclimated to their pens for 2 weeks prior to treatment.

The feed supplied to the animals had the following composition

| Corn | 840 lbs. |
|---|---|
| Soybean meal | 120 |
| Limestone | 10 |
| Trace Mineral Salt | 10 |
| Molasses | 200 |
| Wheat bran | 100 |
| Mixed hay | 720 |
| Vit D | 75 I.U./lb |
| Vit A | 150 I.U./lb |

The test compound in an amount of 0.0055% (50 g/ton) was admixed with the above feed composition. Body weights and feed consumption were recorded at 0, 2, 4 and 6 weeks. Feed efficiencies were calculated.

The results in Table 7 show that the compound at 0.0055% (50 g/ton) in the feed is effective in increasing gains and improving feed efficiency of growing lambs.

TABLE 7

Effects of phenylalanine trichloroethyl ester on body weight gain and feed efficiency of growing lambs

|  | Level in | Body weight gain (kg) | | | Feed efficiency |
| --- | --- | --- | --- | --- | --- |
|  | feed % | 0-2 wks. | 0-4 wks. | 0-6 wk. | (gain/unit of feed) 0-6 wks. |
| Control | — | 2.47 | 5.80 | 8.51 | 0.190 |
| Test compound | 0.0055 (50 g/ton) | 2.97 | 5.82 | 9.08 | 0.196 |

EXAMPLE 10

The test procedure of Example 9 was followed to test the growth effect and feed efficiency of glycine 2,2,2-trichloroethyl ester on growing lambs. The feed composition of Example 9 was used but contained glycine 2,2,2-trichloroethyl ester in an amount of 0.0044% (40 g/ton). There were 44 lambs in the control group receiving the feed composition without additive and 42 lambs receiving the feed composition containing the amino acid ester. The following results were obtained.

TABLE 8

Effect of glycine trichloroethyl ester on weight gain and feed efficiency of growing lambs

|  | Level in | Weight gain (kg) | | | Feed efficiency |
| --- | --- | --- | --- | --- | --- |
|  | feed % | 0-2 wks | 0-4 wks | 0-6 wks | gain/feed 0-6 wks |
| Control | — | 2.32 | 5.09 | 7.18 | 0.148 |
| Test compound | 0.0044 (40 g/ton) | 2.31 | 5.13 | 7.37 | 0.154 |

EXAMPLE 11

The test procedure of Example 9 was followed to test the growth effect and feed efficiency of L-phenylalanine 2,2,2-trichloroethyl ester on growing lambs. The feed composition of Example 9 was used but contained 0.0088% (80 g/ton) of this amino acid ester. There were 59 lambs in the control group fed the feed without additive and 58 lambs in the group fed the feed composition containing the test compound. The following results were obtained.

TABLE 9

Effect of L-phenylalanine trichloroethyl ester on weight gain and feed efficiency of growing lambs

|  | Level in | Weight gain (kg) | | | Feed efficiency |
| --- | --- | --- | --- | --- | --- |
|  | feed % | 0-2 wks | 0-4 wks | 0-6 wks | gain/feed 0-6 wks |
| Control | — | 1.50 | 4.44 | 7.56 | 0.160 |
| Test compound | 0.0088 (80 g/ton) | 1.49 | 4.63 | 7.81 | 0.168 |

EXAMPLE 12

The effect of various compounds alone on the volatile fatty acid concentrations was determined by the procedure of Example 3. The results in the following table show that the compounds listed do not increase the propionic acid concentration and decrease the acetic to propionic acid ratio as do the trichloroethyl esters. A direct comparison between phenylalanine and phenylalanine trichloroethyl ester is provided.

TABLE 10

Effect of various compounds on volatile fatty acid concentrations in the in vitro rumen fermentation

| Compound | Level mg/ml | % of Control | | | | Acetic Propionic |
| --- | --- | --- | --- | --- | --- | --- |
|  |  | Acetic | Propionic | butyric | Total Acids |  |
| p-chlorophenyl-alanine | 0.2 | 91 | 91 | 92 | 91 | 101 |
| L-phenylalanine | 0.2 | 95 | 94 | 97 | 96 | 100 |
| chloral | 0.2 | 88 | 110 | 110 | 96 | 80 |

What is claimed is:

1. An animal feed composition comprising a conventional basic animal feed and a growth promoting amount in the range of about 0.001% to 0.06% by weight of total feed of the trichloroethyl ester of phenylalanine or an acid addition salt thereof.

2. A composition as in claim 1 wherein the amount of the trichloroethyl ester or salt thereof is about 0.004% to 0.016% by weight of the total feed.

3. A ruminant feed composition comprising a basic animal feed for ruminants and about 10 grams to 500 grams per ton of feed of L-phenylalanine 2,2,2-trichloroethyl ester hydrobromide.

4. A ruminant feed composition as in claim 3 wherein the proportion of ester is about 40 grams to 160 grams per ton of feed.

5. A method for improving the growth and feed efficiency of ruminants which comprises feeding to said ruminants a composition comprising a conventional basic animal feed for said ruminants and about 0.001% to 0.06% by weight of total feed of the trichloroethyl ester of phenylalanine or acid addition salt thereof.

6. A method for improving the growth and feed efficiency of ruminants which comprises feeding to said ruminants a feed composition containing L-phenylalanine 2,2,2-trichloroethyl ester hydrobromide in a proportion of about 40 grams to 160 grams per ton of feed.

7. A method for improving the growth and feed efficiency of ruminants which comprises feeding to said ruminants a feed composition containing L-phenylalanine 2,2,2-trichloroethyl ester hydrobromide in a proportion of about 10 grams to 500 grams per ton of feed.

8. A method for improving the growth and feed efficiency of ruminants which comprises feeding to said ruminants in their feed about 0.01 grams to 5 grams per day of the trichloroethyl ester of phenylalanine.

* * * * *

UNITED STATES PATENT AND TRADEMARK OFFICE
CERTIFICATE OF CORRECTION

PATENT NO. : 4,192,889

DATED : March 11, 1980

INVENTOR(S) : Frederic P. Hauck et al.

It is certified that error appears in the above—identified patent and that said Letters Patent are hereby corrected as shown below:

Column 2, line 25, next to the structure insert -- (I) --.
Column 5, line 8, "weighted" should read --weighed--.
Column 6, line 11, "ratio" should read --ration--.

Signed and Sealed this

Sixteenth Day of September 1980

[SEAL]

Attest:

SIDNEY A. DIAMOND

*Attesting Officer*     *Commissioner of Patents and Trademarks*